(12) United States Patent
Pucci (10) Patent No.: US 11,105,004 B2
(45) Date of Patent: Aug. 31, 2021

(54) ELECTROLYSIS HEATING SYSTEM

(71) Applicants: Aurelio Pucci, Frascati (IT); Umberto De Luca, Grottaferrata (IT)

(72) Inventor: Aurelio Pucci, Frascati (IT)

(73) Assignees: Aurelio Pucci, Frascati (IT); Umberto De Luca, Grottaferrata (IT)

( * ) Notice: Subject to any disclaimer, the term of this patent is extended or adjusted under 35 U.S.C. 154(b) by 61 days.

(21) Appl. No.: 16/488,310

(22) PCT Filed: Feb. 20, 2018

(86) PCT No.: PCT/IB2018/051100
§ 371 (c)(1),
(2) Date: Aug. 23, 2019

(87) PCT Pub. No.: WO2018/154476
PCT Pub. Date: Aug. 30, 2018

(65) Prior Publication Data
US 2020/0032405 A1   Jan. 30, 2020

(30) Foreign Application Priority Data
Feb. 23, 2017   (IT) .................. 102017000020606

(51) Int. Cl.
*C25B 1/04*   (2021.01)
*C25B 15/02*   (2021.01)
(Continued)

(52) U.S. Cl.
CPC ............... *C25B 1/04* (2013.01); *C25B 9/19* (2021.01); *C25B 9/73* (2021.01); *C25B 15/02* (2013.01);
(Continued)

(58) Field of Classification Search
None
See application file for complete search history.

(56) References Cited

U.S. PATENT DOCUMENTS 10,422,045 B1 *   9/2019   Warner .................. C25B 1/04
2007/0080071 A1 *   4/2007   Perry, Jr. ............. C25B 15/00
                                                             205/638
(Continued)

FOREIGN PATENT DOCUMENTS

EP           2757178 A1      7/2014
JP        2002-155387 A  *  5/2002   .............. C25B 9/06
(Continued)

OTHER PUBLICATIONS

International Search Report, dated May 16, 2018, from corresponding PCT application No. PCT/IB2018/051100.

*Primary Examiner* — Harry D Wilkins, III
(74) *Attorney, Agent, or Firm* — Nixon & Vanderhye (57) ABSTRACT

An electrolysis heating system includes: A) a generator containing distilled water and connected to a direct electrical current power supply unit for creating a gas electrolytic dissociation; B) a duct conveying the gas from the generator to a first sparger containing distilled water and provided with a replenishment duct for maintaining the level of distilled water; C) a duct conveying the gas to a second sparger containing distilled water; D) a duct conveying the gas from the second sparger to a safety solenoid valve; E) ducts conveying the gas from a safety filter towards a final duct; F) tangential fans along the path of the ducts; G) check valves between the tangential fans and the safety filter; H) a final duct conveying the gas towards an appliance; I) a pressure sensor monitoring outflow pressure; J) a temperature sensor monitoring outflow temperature; K) a control unit with a microprocessor/display.

20 Claims, 3 Drawing Sheets

(51) Int. Cl.
  *C25B 9/19* (2021.01)
  *F24D 12/00* (2006.01)
  *C25B 9/73* (2021.01)

(52) U.S. Cl.
  CPC .......... *F24D 12/00* (2013.01); *F24D 2200/04* (2013.01)

(56) References Cited

U.S. PATENT DOCUMENTS

| | | | |
|---|---|---|---|
| 2007/0210063 A1* | 9/2007 | Conrad | C25B 1/04 219/449.1 |
| 2011/0139097 A1* | 6/2011 | Brown | F02M 25/12 123/3 |
| 2016/0244887 A1* | 8/2016 | Haywood | C25B 15/08 |
| 2017/0037815 A1* | 2/2017 | Watson | F02M 25/12 |
| 2017/0355918 A1* | 12/2017 | Li Gregni | C10K 3/02 |
| 2020/0087590 A1* | 3/2020 | Puma | C10L 3/08 |

FOREIGN PATENT DOCUMENTS

| | | | |
|---|---|---|---|
| KR | 10-0657547 B1 * | 12/2006 | ............... C25B 1/04 |
| KR | 102222625 B1 * | 2/2021 | ............... C25B 1/04 |
| WO | 01/31188 A1 | 5/2001 | |
| WO | WO 02/095090 A1 * | 11/2002 | ............... C25B 9/06 |
| WO | 2010/101484 A1 | 9/2010 | |

* cited by examiner

ELECTROLYSIS HEATING SYSTEM

FIELD OF THE ART

The present invention regards the field of water heating or air conditioning systems. More in detail, it refers to an energy saving and low emission heating system that can be particularly used in gas boilers.

PRIOR ART

In a heating system, a boiler is an equipment in which the transfer of heat from a fuel undergoing combustion towards a liquid occurs without the boiling thereof occurring. On the contrary, should such equipment cause the change of the state of the water from liquid to aeriform, continuously and under controlled conditions, it is better referred to as vapour generator and it is typically used combined with the turbines for producing electrical energy. Part of the development of boilers is due to the development of fuels. From wood of the early days, around the 18th century we moved to coal, which remained the main fuel for 150 years; combustion occurred in the fire-box, basically a grid on which the solid fuel was placed in a more or less mechanised manner and from which the ashes were removed, in a more or less mechanised manner too.

In the 20th century coal was gradually replaced by liquid fuels; this meant replacing the fire-box with an apparatus capable of injecting liquid/gaseous oxidising agent mixtures into the combustion chamber. These devices are referred to as burners.

The boiler basically consists of:
the fire-box or burner: in which there is a flame such to transfer heat both by means of thermal conduction through the hot combustion fumes and by means of irradiation;
the combustion chamber: containing the fire-box (or the burner), usually underlying the fire-box grid, in which combustion ashes accumulate before being removed;
the tube bundle (generally not present in heating boilers): alongside the ducts that connect—in smoke pipe boilers—the fire-box to the flue, and—in water pipe boilers—the cylindrical bodies. The tube bundle serves to increase the exchange surface between fumes and water as much as possible,
the flue: external duct for dispersing exhaust combustion products.

Also due to the current regulations in force, striving towards ensuring safety as regards the discharge of combustion products, the market has progressively developed towards the installation of forced draft airtight chamber boilers. In this boiler, combustion occurs in a closed (airtight) chamber with respect to the surrounding environment and this entails the need of drawing oxidising air from the external through special ducts, with the ensuing need of providing the boiler with a fan with the function of drawing external air and for forcing (forced draft) the ejection of the combustion products towards the flue which disperses them. If, on the one hand, this latter type of boiler ensures safety with respect to the channeling of combustion gas into the environments, on the other it gives rise to problems related to the discharge of the combustion products and the relative flue system ducts, which are under pressure and should ensure durability (even over time).

Another type of boiler is represented by a base boiler, which is definitely more cumbersome with respect to the previous one, and generally provided with a high capacity boiling device, which requires considerable space for the positioning thereof, it can be of the open chamber or airtight chamber type. Open chamber boilers are generally installed in a room designated to serve as a thermal power station, while airtight chamber boilers are installed if positioned in a residential unit due to the safety regulations in force. The higher capacity of the boiling device guarantees higher possibility of simultaneous use of several domestic water drawing points. The exchanger of this type of boiler can be made of steel (e.g. in wall-mounted boilers) or cast-iron elements. When it comes to operation in liquid fuel (diesel) or solid fuel (wood or pellets) mode, given the different configuration of the combustion chamber, the structure is generally made of steel with the boiling device incorporated or not incorporated, as a function of the needs of the building.

Over the last years, the demand has sky-rocketed, due to the safety requirements and energy saving needs as well as due to the technological development regarding the control of the combustion and thermal adjustment. Though the market offers a wide range of solutions, there still lacks a convincing solution capable of including the exploitation of the properties of hydrogen. As a matter of fact, this natural element widely available in an enormous amount of molecules, also including the water-based molecule to name one, can be used as fuel gas and it may generate extremely high temperatures, in the order of 2800° C., against the average 1200° C. of the other gases.

Up to date, hydrogen seems to have been taken into account more for the development of innovative vehicle engines, to enhance the efficiency thereof and obtain low (if not zero) emissions of CO2, as observable from patent no US 2016244887 having the title "Hydrolysis system and method for a vehicle engine". The latter regards an electrolysis system which produces fuel gas consisting of a hydrogen and oxygen mixture through electrolysis. Such fuel gas is then placed at contact with an oxidising gas in an expansion chamber in which the combustion which runs the engine occurs. The problem of this and other patents regarding hydrogen combustion regard the safety of the system or engine. As a matter of fact, a hydrogen and oxygen mixture of this type is highly flammable, the temperature is extremely high to the extent of melting most of the metals and the risk of backfire, with the entailed catastrophic consequences, is high.

Thus, an object of the present invention is to provide a new and innovative heating system capable of exploiting the properties of hydrogen derived from the electrolysis process under entirely safe conditions. A further object of the present patent is to describe a heating system capable of reducing both the consumptions and emissions of CO2 with respect to the prior art systems.

DESCRIPTION OF THE INVENTION

An eco-friendly electrolysis heating system is obtained according to the present invention given that it enables low energy consumption and extremely low CO2 emissions.

The system described in detail hereinafter, has the object of using the gaseous hydrogen and oxygen mixture (HH—O) obtained from an electrolytic water dissociation action.

The advantages of the present invention consist in improving the conventional gas combustion process in that the user device 100 of the present system will continue exploiting LPG or methane at a percentage comprised between 20% and 30%, replacing the remaining 70%-80% with the gaseous mixture (HH—O) deriving from the system upstream of the appliance 100. The use of the hydrogen and oxygen mixture advantageously entails high energy saving, thus reducing the operating costs and achieving extremely high thermal efficiency. Additionally, thanks to the combustion of said gaseous mixture, the CO/CO2 emissions drop considerably and this due to the percentage increase of emission of plain water vapour, which is entirely harmless for the environment. In light of the above, the system in question is rightfully considered among the eco-friendly heating systems.

Energy saving is basically a result of the characteristics of hydrogen which, burning, generates extremely high temperatures at around 2,800° C., more than twice the temperatures achieved by the combustion of gases used in similar systems up to now, which averagely burn at about 1,200° C.

A further advantage of the present invention lies in the low installation costs, which would enable a quick spreading of the technology described hereinafter, with immediate benefits to the ecosystem and the economy of the users utilising it. This being due to the fact that the system can also be adapted to existent and operative boilers or to other types of appliances 100 currently running on methane gas or LPG.

More in detail, the essential components of the system according to the present invention are:

A) at least one generator 10 or a container partly filled with distilled water (H2O) according to a predetermined filling level and kept constant by means of the ducts described hereinafter. Said generator 10, is advantageously made with at least one pair metal layers intervalled by at least one layer of a common insulating material and it is connected to a direct current power supply unit 11 which enables the widely known electrolytic dissociation process. The result of the process is a gas (HH—O) consisting of a hydrogen and oxygen mixture. In other embodiments of the present invention, it is advantageously possible to provide several generators 10 served by the same source of direct electrical current power supply source 11. The supply of distilled water (H2O) for the generator 10 and for the other components of the system that provide for the use thereof, can be advantageously guaranteed by the presence of a distilled water (H2O) tank connected to the generator 10 and possibly also to the other components described hereinafter. Besides the tank, there can advantageously also be provided a common distiller for supplying distilled water (H2O) to the system, thus making it independent;

B) at least one first sparger 20, i.e. a container partly filled with distilled water (H2O) up to a predetermined level. A duct 15—which conveys the gas (HH—O) from an outflow nozzle 12 of said generator 10 up to below the water level of said first sparger 20—reaches said first sparger 20. Furthermore, the second sparger 20 is advantageously provided with at least one replenishment duct 14 in which the distilled water (H2O) flows so as to keep the filling level of the generator 10 and of the first sparger 20 constant;

C) at least one second sparger 30 which, similarly to the first sparger 20, is partly filled with distilled water (H2O) up to a predetermined level. A duct 22—which conveys the gas (HH—O) from an outflow nozzle 21 of said first sparger 20 up to below the water level of said second sparger 30—reaches said second sparger 30. In other possible embodiments of the system according to the present invention, there may be present further spargers subsequent to the second, all serving the same function and operating in the same way, D) a duct 32, connected to an outflow nozzle 31 of said second sparger 30 or of the last of the series of spargers that advantageously conduct the gas (HH—O) to a safety solenoid valve 40. The function of the latter element, like others described hereinafter, is to advantageously prevent any possibility of backflow of outflowing gas (HH—O) which is highly hazardous and flammable;

E) two twinned ducts 45-45' suitable for conveying the outflowing gas (HH—O) to a final duct 61 in which said pair of ducts 45-45' advantageously converge up to reaching the end appliance 100, depart starting from said safety solenoid valve 40. The latter, preferably consists of a common gas boiler with a combustion chamber 150 provided with a coil 130 arranged at the upper part at a plurality of flames 120 fuelled by LPG or methane gas. A plurality of nozzles 110 which are the termination of said final duct 61 and are suitable to introduce a predetermined amount of said gas (HH—O) towards said flames 120, determining the combustion of said gas (HH—O) and the ensuing heating of the water contained in said coil 130, reach into the combustion chamber 150. The pressure of the outflowing gas (HH—O) is advantageously very low, given that the high combustion capacity of the gas (HH—O) is exploited in the system described herein. More in detail, the pressure of the gas (HH—O) in an appliance 100 of the type of a common gas boiler, is comprised between 0.01 bars and 1 bar, preferably 0.2 bars. A safety filter 65 is advantageously arranged on the path of said final duct 61, still for safety reasons aimed at preventing the backflow of the gas (HH—O);

F) on the path of said pair of ducts 45-45', which start from said safety solenoid valve 40 to meet in the final duct 61, there is arranged at least one pair of tangential fans 50-50' and at least one pair of check valves 60-60'. Said tangential fans 50-50' are advantageously connected to a corresponding pair of motors 55-55', which have the function of modulating and quickening the flow of said gas (HH—O). Said check valves 60-60' once again have the function of preventing the backflow of gas (HH—O). It should be observed that the devices aimed at increasing the safety of the system, advantageously increase in numbers progressively approaching the appliance 100 in which the gas (HH—O) burns;

A) at least at the final duct 61, but preferably in a plurality of pre-established points of the system described herein, there are advantageously arranged pressure sensors 70 and temperature sensors 75, suitable to monitor the values regarding the pressure and temperature of the gas (HH—O) flowing through.

Advantageously, the entire system is managed and monitored by at least one control unit 80, even positioned remotely, which has a dedicated microprocessor 90. More in detail, said control unit 80 receives data coming from said pressure sensors 70, from said temperature sensors 75 and from a possible pyrometric sensor 140 which can be advantageously arranged in the combustion chamber 150 of the appliance 100, to monitor the intensity of the flame. Said control unit 80 is also suitable to manage, according to parameters pre-set by a maintenance user, the function of replenishing distilled water (H2O) in the generator 10 through the replenishment duct 14, the electric power of the power supply unit 11, the safety solenoid valve 40 and the motors 55-55' of the tangential fans 50-50'.

Furthermore, said control unit 80 advantageously monitors the correct operation of any other component of the system, in particular the check valves 60-60' and the safety filter 65.

In case of an error, malfunction or failure, said control unit 80, is advantageously suitable to enable displaying a message showing the nature of malfunctioning on a special display 81. This display 81 serves as a true communication interface between the control unit 80 and the system maintenance man, who—using it—may also set all operating parameters of each component.

In an embodiment, said control unit 80 is advantageously suitable to be connected to a common electronic device remotely positioned for the communication of possible error, malfunction or failure messages and to enable the switching ON/OFF of the system by entering pre-set safety codes. Advantageously, it will also be provided with a timer suitable to enable a user to set a determined time for automatically switching the system ON/OFF.

DESCRIPTION OF THE FIGURES

The invention will be described hereinafter in at least one preferred embodiment, provided by way of non-limiting example, with reference to the attached figures, wherein.

DETAILED DESCRIPTION OF THE INVENTION

Now, the present invention will be illustrated purely by way of non-limiting example, with reference to the figures illustrating some embodiments regarding the present inventive concept.

Figure 3:
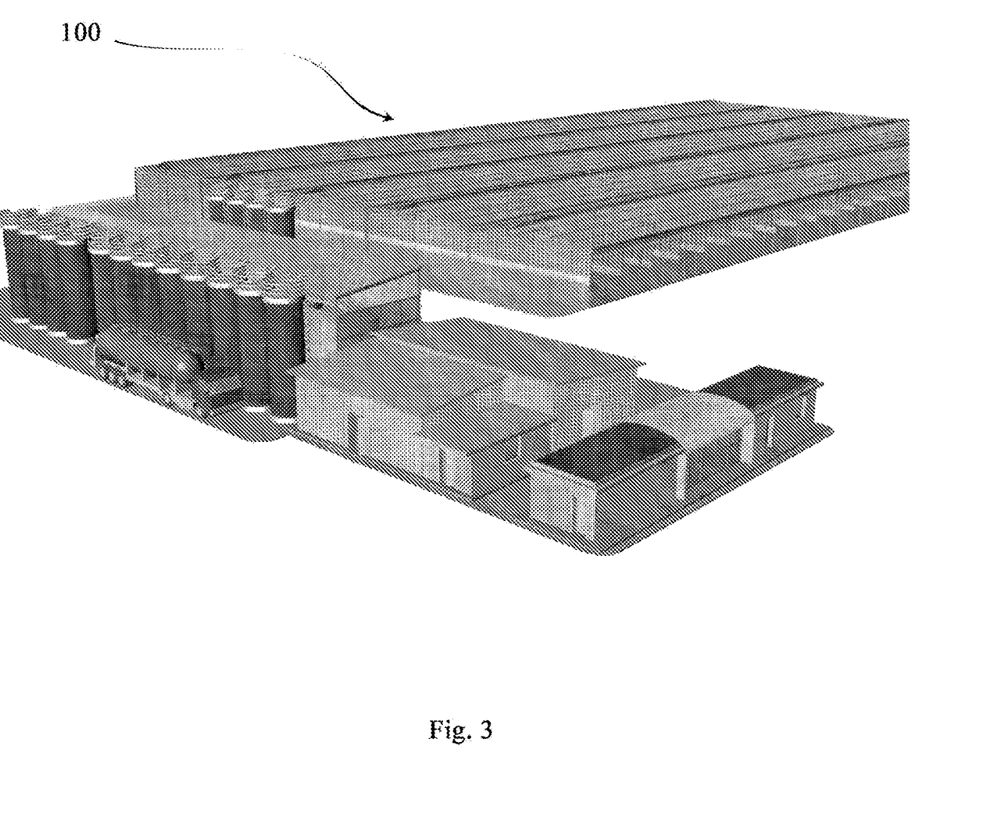
FIG. 3 shows an embodiment of the system subject of the present invention in a microalgae industrial cultivation plant. In this case, the appliance 100 consists of boilers which heat the water for cultivating the micro-organisms.

With reference to FIG. 3 there is shown an operating diagram of a microalgae industrial cultivation plant, in which the required heating of cultivation water is supplied by the system subject of the present invention.

The system, suitably dimensioned depending on the capacity of the system, is used for heating the water of the containers in which the chlorophyll function is carried out. As a matter of fact, the water used in the photosynthesis process requires a constant temperature at around 30° C.

The aforementioned system also has a medium or high enthalpy geothermal system for producing the electrical energy required for the photosynthesis of the omega 3 uni-cellular algae. This produced electrical energy falls within the context of lighting installations in which the result of the light spectrum is identified as very close to the solar one. This characteristic benefits the coefficient of efficiency of the chlorophyll function. The artificial lighting and heating of the greenhouses make the plant fully independent.

Furthermore, in the step of transforming the oil for propulsion or for the production of products for the pharmaceutical industry, electrical and thermal energy is also integrated with the $CO_2$ production plant required to complete chlorophyll photosynthesis. Lastly, the integrated system makes the conditioning and energy supply process of the system independent.

Furthermore, thanks to the use of the present invention to obtain the correct heating of the culture water, the emissions are also extensively reduced in that they substantially consist of water vapour.

Figure 1:
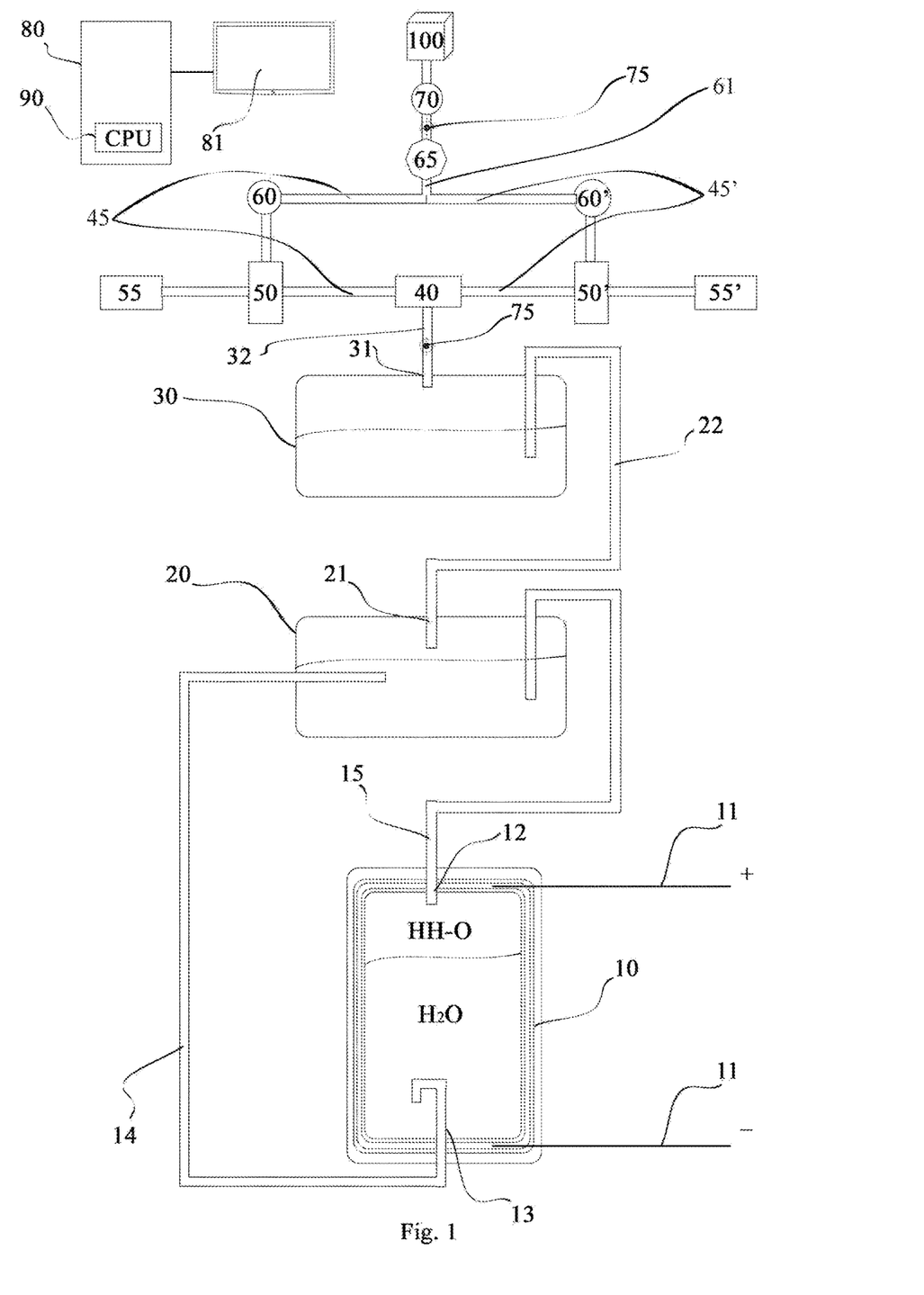
FIG. 1 shows an operating diagram of a heating system according to the present invention. In particular, this figure shows the system upstream of the appliance 100, represented more in detail in the subsequent figure. It is clear that a plurality of appliances 100, all symbolically represented by the small cube bearing the reference number 100, can be connected to the present system. Furthermore, on the top left there is shown a diagram of the control and management unit 80 which constantly verifies the correct operation of the entire system.

With reference to FIG. 1, there is schematically shown the operation of the heating system which also consists of, among the various components, a plurality of components suitable to make the system safe albeit the use of hydrogen which, as known, is highly flammable and potentially hazardous.

In order to meet all necessary requirements and achieve the advantages indicated in the present patent, said system should at least consist of:

A) a generator 10, or a container of distilled water (H2O), obtained using at least one pair of metal layers intervalled by at least one layer of a common insulating material. It is connected to an electrical current power supply unit 11 for carrying out an electrolytic dissociation process, creating a gas consisting of a hydrogen and oxygen mixture (HH—O);

B) a first sparger 20 also containing a predetermined amount of distilled water (H2O) and provided with at least one replenishment duct 14 suitable to convey part of the distilled water (H2O) contained therein towards said generator 10 so as to keep the mutual filling level constant;

C) a duct 15 for the outflow of the gas (HH—O) connecting said generator 10 to said first sparger 20 conveying a predetermined amount of gas (HH—O) from an outflow nozzle 12 of said generator 10 to a submerged point of said first sparger 20;

D) a second sparger 30, entirely similar to said first sparger 20, containing distilled water (H2O) and connected to said first sparger 20 through a duct 22 for the outflow of the gas (HH—O) suitable to convey a predetermined amount of gas (HH—O) from an outflow nozzle 21 of said first sparger 20 to a submerged point of said second sparger 30;

E) a duct 32 for the outflow of the gas (HH—O) suitable to convey said gas (HH—O) from an outflow nozzle 31 of said second sparger 30 to a safety solenoid valve 40 suitable to prevent the backflow of said gas (HH—O) following an inverse path with respect to the pre-established one;

F) a pair of ducts 45-45' for conveying said gas (HH—O) from said safety solenoid valve 40 to a safety filter 65, which prevents the backflow of the gas (HH—O) into the ducts upstream, through which said gas (HH—O) reaches at least one final duct 61;

G) a pair of tangential fans 50-50', connected to a corresponding pair of motors 55-55', arranged along the path of said pair of ducts 45-45', suitable to modulate and possibly quicken—in a predetermined fashion—the flow of said gas (HH—O) through said ducts (45-45');

H) at least one pair of check valves 60-60', also suitable perform the safety function, arranged along the path of said pair of ducts 45-45' between said tangential fans 50-50' and said safety filter 65;

I) at least one final duct 61 through which said gas (HH—O) contained in said pair of ducts 45-45' reaches said appliance 100.

In order to enable a user, designated for the control and maintenance of the system and further enhance the safety standards offered by the present patent, said system is provided with at least:

J) one or more pressure sensors 70, arranged at least at said final duct 61, suitable to monitor the values regarding the pressure of the outflowing gas (HH—O);

K) one or more temperature sensors 75, preferably arranged at all ducts of said system but at least in the final one 61, suitable to monitor the temperature of the outflowing gas (HH—O);

L) a control unit 80 provided with a microprocessor 90, suitable to monitor the data coming from said pressure sensors 70 and said temperature sensors 75 and suitable to manage—according to pre-set parameters—the switching of the system ON and OFF, the replenishment of the distilled water (H2O) through said replenishment duct 14, the electrical power supply of said supply unit 11, said safety solenoid valve (40) and said motors 55-55' of said tangential fans 50-50', the correct operation of said check valves 60-60', of said safety filter 65 and any other component of said system;

M) a display 81 suitable to serve as a communication interface between said control unit 80 and a user designated to check the operation; said display 81 enabling the display of possible error, malfunction or failure messages and enabling setting the required system operating parameters.

In a preferred version, in order to make the whole system even more independent, it can be provided with a water distiller connected at least to said generator 10, preferably connected to said spargers 20, 30 too, so as to supply the required amount of distilled water (H2O) to the system. The system may also be provided with a tank for distilled water (H2O) suitable to replenish the distilled water (H2O) in said generator 10 according to parameters pre-set and managed by said control unit 80.

Figure 2:
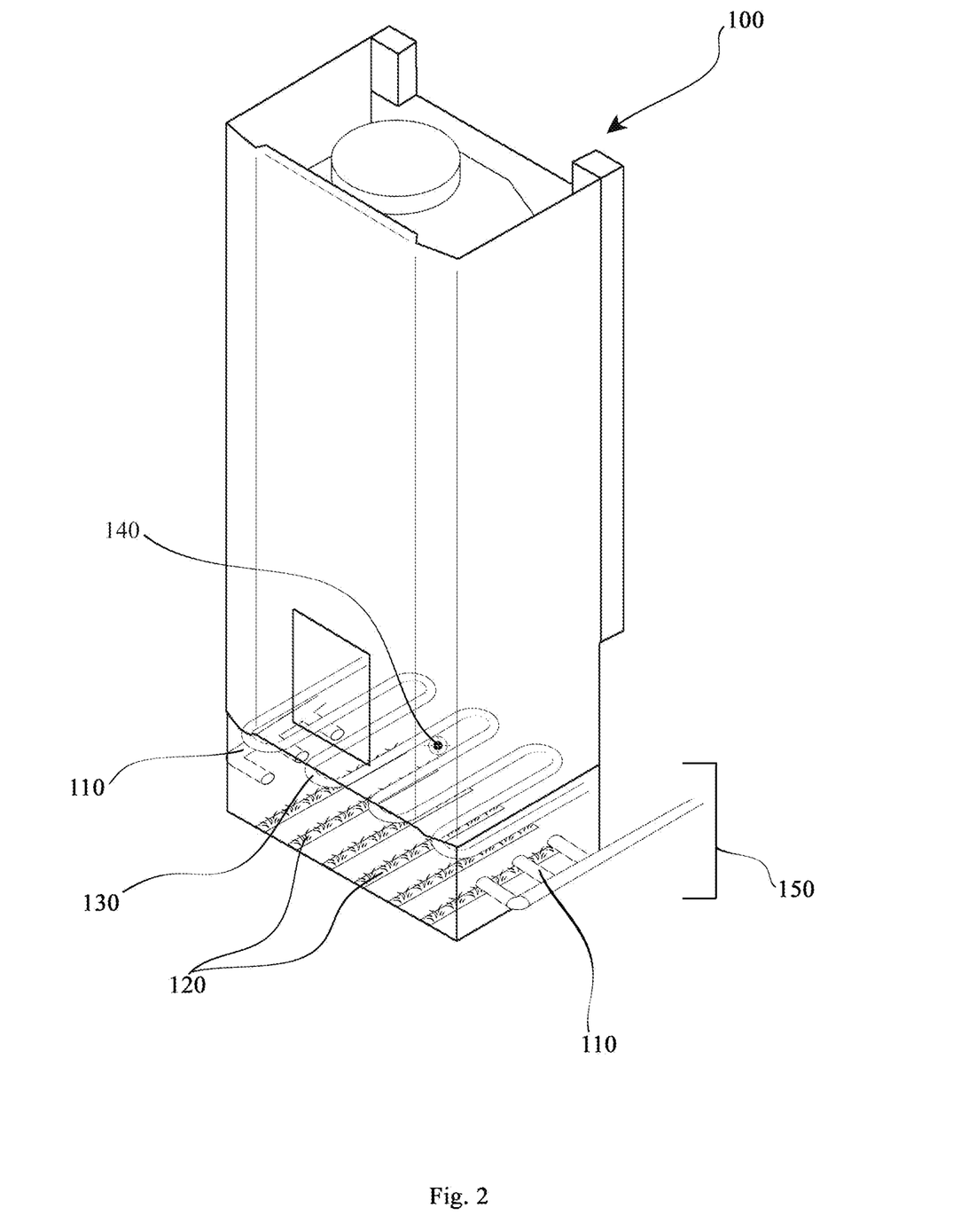
FIG. 2 shows an example of one of the possible appliances 100 consisting of a gas boiler commonly used for domestic heating. The combustion chamber 150 is characterised by a coil 130 overlying a plurality of flames 120 fed with gas. The nozzles 110, represented on the right and left side of the boiler, are suitable to blow the hydrogen and oxygen mixture on said flames 120, causing a combustion that heats the water flowing in the coil 130.

Depending on the capacity of the system designated to be built and the required safety features the water heating system described up to now can also be designed differently, still falling within the scope of protection of the present patent, by installing:

one or more further spargers after said second sparger 30;

a plurality of generators 10 arranged adjacent to each other and connected to the direct electrical current supply unit 11;

a pyrometric sensor 140 arranged inside said combustion chamber 150 of the appliance 100, suitable to monitor the combustion of said gas HH—O and thus automatically adjust the flow of said gas HH—O through said nozzles 110; the entirety with the aim of maintaining the thermal power within the pre-set safety parameters; said pyrometric sensor 140, if provided, must also be placed in data communication with said control unit 80.

a remote connection system suitable to enable data communication between said control unit 80 and a common electronic device remotely positioned for the communication of possible error, malfunction or failure messages and to enable the switching ON/OFF of the system by entering pre-set safety codes.

a timer connected to said control unit 80 to enable a user to set a determined time for automatically switching the system ON/OFF.

The invention claimed is:

1. An electrolysis heating system, comprising:

a generator including a container configured to contain a predetermined amount of distilled water, obtained with at least one pair of metal layers spaced by at least one layer made of common insulating material, said generator being connected to an electrical current supply unit configured to provide a direct electrical current to dissociate the distilled water contained in said generator, through an electrolytic dissociation process, creating a gas consisting of a hydrogen and oxygen mixture;

at least one first sparger configured to contain a predetermined amount of distilled water, provided with at least one replenishment duct configured to convey part of the distilled water contained in said first sparger towards said generator maintaining the mutual filling level constant;

at least one first duct for the outflow of gas configured to convey a predetermined amount of gas from an outflow nozzle of said generator to a site of said first sparger, said site being disposed beneath the level of said distilled water of the first sparger;

at least one second sparger configured to contain a predetermined amount of distilled water, the at least one second sparger being connected to said at least one first sparger through a first outflow duct for the outflow of the gas configured to convey a predetermined amount of gas from an outflow nozzle of said at least one first sparger to a site of said at least one second sparger, said site of the second sparger being arranged below the level of said distilled water of the second sparger;

at least one second duct for the outflow of gas configured to convey a predetermined amount of gas from an outflow nozzle of said second sparger to a common safety solenoid valve configured to prevent the backflow of said gas following an inverse path with respect to a pre-set path;

at least one pair of ducts configured to convey a predetermined amount of gas from said safety solenoid valve to a safety filter through which said gas reaches at least one final duct, said safety filter being configured to prevent backflow of the gas into the at least one pair of ducts upstream;

at least one pair of tangential fans connected to a corresponding pair of motors, the at least one pair of tangential fans being disposed along the path of said at least one pair of ducts, the at least one pair of tangential fans being configured to modulate and quicken the flow of said gas through said at least one pair of ducts, in a predetermined manner;

at least one pair of check valves disposed along the path of said at least one pair of ducts between said at least one pair of tangential fans and said safety filter;

at least one final duct configured to convey the flow of said gas contained in said at least one pair of ducts towards any appliance;

at least one pressure sensor disposed at least at said at least one final duct, the at least one pressure sensor being configured to monitor the values regarding the pressure of the outflowing gas;

at least one temperature sensor disposed at least at said at least one final duct, the at least one temperature sensor being configured to monitor the temperature of the outflowing gas;

at least one controller provided with a microprocessor, the at least one controller being configured to monitor data coming from said at least one pressure sensor and said at least one temperature sensor and configured to manage, according to pre-set parameters,
switching ON/OFF of the system, and
replenishing the distilled water through said at least one replenishment duct, electrical power of said electrical current supply unit, said safety solenoid valve and said motors of said at least one pair of tangential fans,
said at least one controller being further configured to monitor a correct operation of said pair of check valves, said safety filter, and any other component of said system; and
at least one display configured to serve as a communication interface between said at least one controller and a user designated to check the operation, said at least one display enabling a display of error, malfunction or failure messages and enabling setting required system operating parameters.

2. The electrolysis heating system, according to claim 1, wherein said appliance is a common gas boiler with a combustion chamber provided with a coil disposed at an upper part and with a plurality of flames supplied with LPG or methane gas disposed at a lower part of said combustion chamber, said appliance being provided with a plurality of nozzles, connected to said at least one final duct, configured to introduce a predetermined amount of said gas towards said plurality of flames, determining the combustion of said gas and an ensuing heating of water contained in said coil.

3. The electrolysis heating system, according to claim 2, further comprising a water distiller connected at least to said generator, the water distiller being configured to provide a required amount of distilled water to the system, activation and deactivation of said water distiller being managed by said at least one controller.

4. The electrolysis heating system, according to claim 2, further comprising a tank for distilled water configured to replenish the distilled water in said generator according to the pre-set parameters and managed by said at least one controller.

5. The electrolysis heating system, according to claim 2, further comprising at least one additional sparger installed in succession after said at least one second sparger, the at least one additional sparger being configured to contain a predetermined amount of distilled water, the at least one additional sparger being connected to said at least one second sparger through a second outflow duct for outflow of the gas configured to convey a predetermined amount of gas from an outflow nozzle of said at least one second sparger to a site of said at least one additional sparger, said site of the at least one additional sparger being disposed below the level of said distilled water in the at least one additional sparger.

6. The electrolysis heating system, according to claim 2, wherein said appliance is provided with a common pyrometric sensor disposed inside said combustion chamber and configured to monitor the combustion of said gas and thus automatically adjust the flow of said gas through said nozzles to maintain thermal power within the pre-set parameters, said pyrometric sensor being in data communication with said at least one controller.

7. The electrolysis heating system, according to claim 6, further comprising a water distiller connected at least to said generator, the water distiller being configured to provide a required amount of distilled water to the system, activation and deactivation of said water distiller being managed by said at least one controller.

8. The electrolysis heating system, according to claim 6, further comprising a tank for distilled water configured to replenish the distilled water in said generator according to the pre-set parameters and managed by said at least one controller.

9. The electrolysis heating system, according to claim 6, further comprising at least one additional sparger installed in succession after said at least one second sparger, the at least one additional sparger being configured to contain a predetermined amount of distilled water, the at least one additional sparger being connected to said at least one second sparger through a second outflow duct for outflow of the gas configured to convey a predetermined amount of gas from an outflow nozzle of said at least one second sparger to a site of said at least one additional sparger, said site of the at least one additional sparger being disposed below the level of said distilled water in the at least one additional sparger.

10. The electrolysis heating system, according to claim 1, further comprising a water distiller connected at least to said generator, the water distiller being configured to provide a required amount of distilled water to the system, activation and deactivation of said water distiller being managed by said at least one controller.

11. The electrolysis heating system of claim 10, wherein the water distiller is also connected to the at least one first sparger and the at least one second sparger.

12. The electrolysis heating system, according to claim 10, further comprising a tank for distilled water configured to replenish the distilled water in said generator according to the pre-set parameters and managed by said at least one controller.

13. The electrolysis heating system, according to claim 10, further comprising at least one additional sparger installed in succession after said at least one second sparger, the at least one additional sparger being configured to contain a predetermined amount of distilled water, the at least one additional sparger being connected to said at least one second sparger through a second outflow duct for outflow of the gas configured to convey a predetermined amount of gas from an outflow nozzle of said at least one second sparger to a site of said at least one additional sparger, said site of the at least one additional sparger being disposed below the level of said distilled water in the at least one additional sparger.

14. The electrolysis heating system, according to claim 1, further comprising a tank for distilled water configured to replenish the distilled water in said generator according to the pre-set parameters and managed by said at least one controller.

15. The electrolysis heating system, according to claim 1, further comprising at least one additional sparger installed in succession after said at least one second sparger, the at least one additional sparger being configured to contain a predetermined amount of distilled water, the at least one additional sparger being connected to said at least one second sparger through a second outflow duct for outflow of the gas configured to convey a predetermined amount of gas from an outflow nozzle of said at least one second sparger to a site of said additional sparger, said site of the at least one additional sparger being disposed below the level of said distilled water in the at least one additional sparger.

16. The electrolysis heating system, according to claim 1, further comprising a plurality of generators disposed adjacent to each other and connected to the electrical current supply unit.

17. The electrolysis heating system, according to claim 1, wherein said at least one controller is configured to be connected to a common electronic device remotely positioned for communication of error, malfunction or failure messages and to enable the switching ON/OFF of the system by entering pre-set safety codes.

18. The electrolysis heating system, according to claim 1, wherein said at least one controller is provided with a timer configured to enable a user to set a determined time for automatically switching the system ON/OFF.

19. The electrolysis heating system, according to claim 1, wherein the system is configured to be installed on any new or existent appliance supplied with LPG or methane gas.

20. The electrolysis heating system of claim 1, wherein:
the appliance is a common gas boiler,
the at least one pressure sensor is a plurality of pressure sensors, and
the at least one temperature sensor is a plurality of temperature sensors disposed at all the ducts of the system.

* * * * *